May 15, 1923.
G. FERGUSON
REFRIGERATING SYSTEM
Filed April 24, 1920
1,455,580
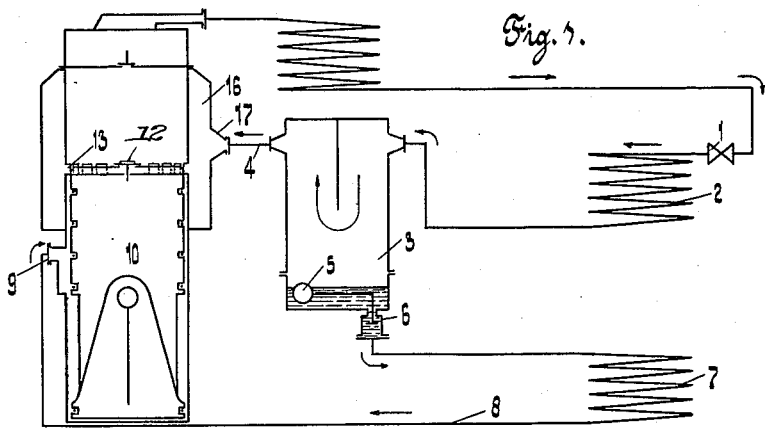
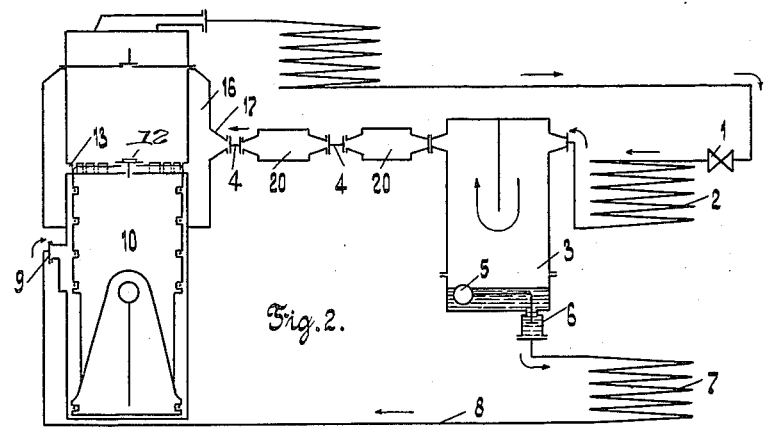
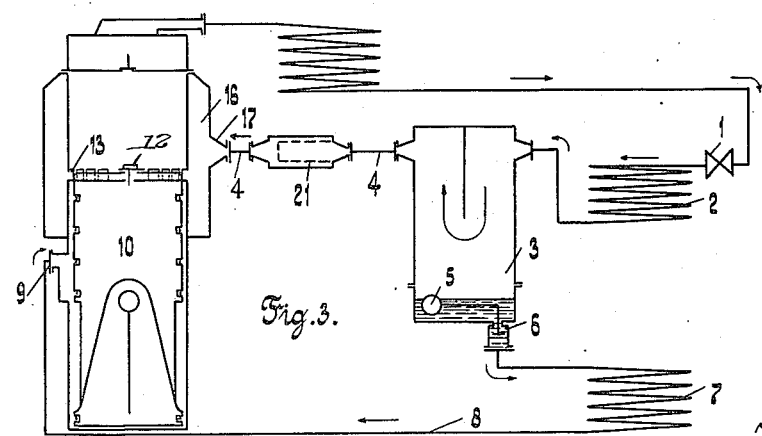
Witnesses
Inventor
George Ferguson
By
James L. Norris
Attorney Patented May 15, 1923.

1,455,580

UNITED STATES PATENT OFFICE.

GEORGE FERGUSON, OF APELDOORN, NETHERLANDS, ASSIGNOR TO APELDOORNSCHE MACHINEFABRIEK EN MELAALGIETERIJ VOORHEEN LOOG LANDAAL, OF APELDOORN, NETHERLANDS, A LIMITED LIABILITY COMPANY OF NETHERLANDS.

REFRIGERATING SYSTEM.

Application filed April 24, 1920. Serial No. 376,406.

(GRANTED UNDER THE PROVISIONS OF THE ACT OF MARCH 3, 1921, 41 STAT. L., 1313.)

*To all whom it may concern:*

Be it known that I, GEORGE FERGUSON, a subject of the Queen of the Netherlands, residing at Apeldoorn, Province of Gelderland, in the Kingdom of the Netherlands, have invented certain new and useful Improvements in Refrigerating Systems, of which the following is a specification, and for which I have filed applications in the Kingdom of the Netherlands, No. 9026, November 20th, 1917, Patent No. 4494; Kingdom of the Netherlands, 9704, April 8th, 1918, Patent No. 4496; Germany, 31087, October 21, 1918, patent not granted; England, 19084, November 20, 1918, Patent No. 120,923; England, 19106, November 21, 1918, Patent No. 125,358; Belgium, 225381, July 8, 1919, Patent No. 281,284; France, 115372, July 22, 1919, Patent No. 501,818; Denmark, 2034/19, July 18, 1919, Patent No. 27768; Denmark, 2033/19, July 18, 1919, Patent No. 26834.

The invention relates to a compression refrigerating system, working with two evaporating pressures and is a continuation in part of my application for a patent Serial No. 261,643 filed November 8, 1918 which eventuated into a patent No. 1,410,394 issued March 21, 1922.

According to the present invention a separator for the liquid is placed at the outlet of the highpressure evaporator, said separator having a special float device which automatically opens a valve for the gas, when the difference of pressure between the highpressure and the lowpressure evaporator becomes too large.

Furthermore according to the invention the liquid separator, arranged between the highpressure evaporator and the compressing cylinder may be provided with apertures for the inlet and the outlet which grow wider inwardly.

The invention is illustrated and explained by the accompanying drawing, in which:

Fig. 1 gives the diagram of a complete refrigerating plan according to the present invention, working with two evaporating pressures in a single compressing cylinder which in the present case is a single acting vertical machine and in which the suction valve is arranged in the piston.

Fig. 2 shows the diagram of a refrigerating plan containing several receivers in the pipe between highpressure evaporator and the compressor.

Fig. 3 gives another diagram showing a liquid separator and a sieve in said pipe.

1 is a regulating cock, such as generally used with compression refrigerating machines. Through this cock the circulating liquid flows from a condenser to the high pressure evaporating coil 2. In this high pressure evaporator heat is absorbed at high pressure, this evaporating a part of the liquid therein, so that after passing the high pressure evaporator there is a mixture of gas and liquid. This mixture is led to the liquid separator 3, which eventually forms part of the high pressure evaporator. From this separator the high pressure gas is sucked off by the compressor through a pipe 4 in a manner which will be explained further on. The liquid collects at the bottom of the separator and is discharged through a float-device 5 to the lowpressure evaporator 7.

When the level of the liquid rises in the separator the float-ball 5 will also rise, thus lowering the float-valve 6, which is then opened to discharge the liquid into the lowpressure evaporator. This float-valve is influenced not only by the rise of the float-ball, but also directly by the difference in pressure between the highpressure and the lowpressure evaporator. As the float-level is double armed, the valve when opening, moves in a downward direction that is in the same direction in which the liquid passes through this valve. The overpressure in the highpressure evaporator therefore, independently of the level of the liquid, tends to open the float-valve. The dimensions of the valve 6 and the whole float-device are such, that when working normally, the motion of the float-valve depends chiefly on the level of the liquid. When the pressure rises too high in the highpressure evaporator, or decreases too much in the lowpressure evaporator, such difference in pressure will force the valve open, even if there is no liquid in the separator. The difference in pressure is then reduced in the high pressure evaporator and raised in the low pressure evaporator and the normal working of the device is then again secured.

The liquid which is discharged into the low pressure evaporator 7, is evaporated therein at a lowpressure, so that in this lowpressure evaporator heat is absorbed at a low temperature. From there the developed vapours are led in the usual way through a pipe 8 to the suction opening 9 of the compressor.

The drawing shows a vertical single acting compressing cylinder 11, into which the vapours developed in the evaporators are drawn by a hollow piston 10, which at one end is provided with a suction valve 12. The high pressure vapours enter into the cylinder as soon as the piston 10 opens the apertures 3 at the end of the downward stroke. The cylinder then already is filled for the greater part with lowpressure vapours which in the usual way are drawn into the cylinder from the lowpressure evaporator 7, in which by the evaporating of the liquid at a lowpressure and at a low temperature, cold is produced.

The admission of the low pressure vapours is continued until the rise of the pressure in the cylinder (on account of the admission of the high pressure vapours through the apertures 13) closes the suction valve 12. These apertures 13, which in axial direction of the cylinder are of small size, are arranged in a large number around the entire circumference of the cylinder.

In the receiver 16 which encircles the cylinder, the highpressure vapours enter from evaporator through pipe 4 and opening 17, which is enlarged from its inlet end toward the receiver. This receiver enables the gas to flow uniformly through all the apertures 13 into the cylinder. In the receiver, the velocity of the gas is naturally much less than in the apertures 13 and the pipe 4; therefore between pipe 4 and the cylinder the current of gas is first retarded and then accelerated.

Each transformation of velocity into pressure and of pressure into velocity is accompanied by losses caused by friction, which result in the production of useless or disadvantageous heat, instead of useful energy. This is of great importance, especially when, as in the present case, high velocities must be obtained during a short period of admission. These losses are the greatest, when these transformations are performed with interruptions. The sieve and the casing of the separator, which may serve as receiver, are provided with apertures for the inlet and outlet. In order to here also obtain a favourable transmission of velocity into pressure according to this invention, the inlet and outlet apertures of the sieve and separator are enlarged have a conical form in the same manner as the aperture 17 for the jacket of the compressing cylinder.

The losses caused by friction are thus reduced and therefore a more perfect and rapid inlet of the highpressure gases into the cylinder is obtained.

In order to accelerate the admission of the highpressure gases from the highpressure evaporator into the cylinder to a greater extent, several receivers 20 may be arranged in the pipe 4, between the highpressure evaporator and the receiver 16. (Fig. 2.) These receivers moderate the interruptions in the current of the gas, caused during the short period of admission into the cylinder and therefore prevent great reductions of pressure in the highpressure evaporator and thus also increase the pressure, which is attained in the cylinder when this is filled with highpressure gas.

Instead of separate receivers 20 arranged in the pipe 4, the liquid separator 3 and a sieve 21 may be used together for this purpose. Usually a perforated pipe with sieve are arranged in the suction-pipes, in order to prevent the entrance of strange matters into the cylinder. The liquid separator, which is placed at the outlet of the highpressure evaporator, serves to separate the liquid from the mixture of highpressure vapours and liquid and to lead the liquid to the lowpressure evaporator.

What I claim is:

1. In a compression refrigerating system, a high pressure evaporator and a low pressure evaporator for the refrigerating liquid, a chamber connected to the outlet of the high pressure evaporator and to the inlet of the low pressure evaporator to receive the liquid and gas resulting from evaporation in the high pressure evaporator, and a valve controlling the flow of liquid from said chamber to the low pressure evaporator, said valve being operable either by the level of the liquid in said device or by an excessive difference between the pressures existing in said high pressure evaporator and said low pressure evaporator.

2. In a compression refrigerating system, a high pressure evaporator and a low pressure evaporator for the refrigerating liquid, a chamber connected to the outlet of the high pressure evaporator and to the inlet of the low pressure evaporator to receive the liquid and gas resulting from evaporation in the high pressure evaporator, a valve controlling the flow of liquid from said chamber to the low pressure evaporator, and a float in said chamber associated with said valve and adapted to open said valve when the lquid in said chamber reaches a predetermined level, said valve being also subject to the pressure existing in said chamber and adapted to be opened by an abnormal difference between the pressures existing in said high pressure evaporator and in said low pressure evaporator.

3. In a compression refrigerating system having high and low pressure evaporators, means for separating liquid and gas resulting from the high pressure evaporator, comprising a separator, a valve controlling the flow of liquid from said separator to the low pressure evaporator, and a float in said separator associated with said valve and adapted to open the latter when the liquid in said separator reaches a predetermined level, said valve being also subject to and adapted to be opened by the differential pressure existing between the separator and the low pressure evaporator.

In testimony whereof I have hereunto set my hand, this first day of April, 1920.

GEORGE FERGUSON.